Nov. 24, 1936.   J. W. LOGAN, JR   2,061,912
RETARDATION CONTROLLER DEVICE
Filed April 8, 1936
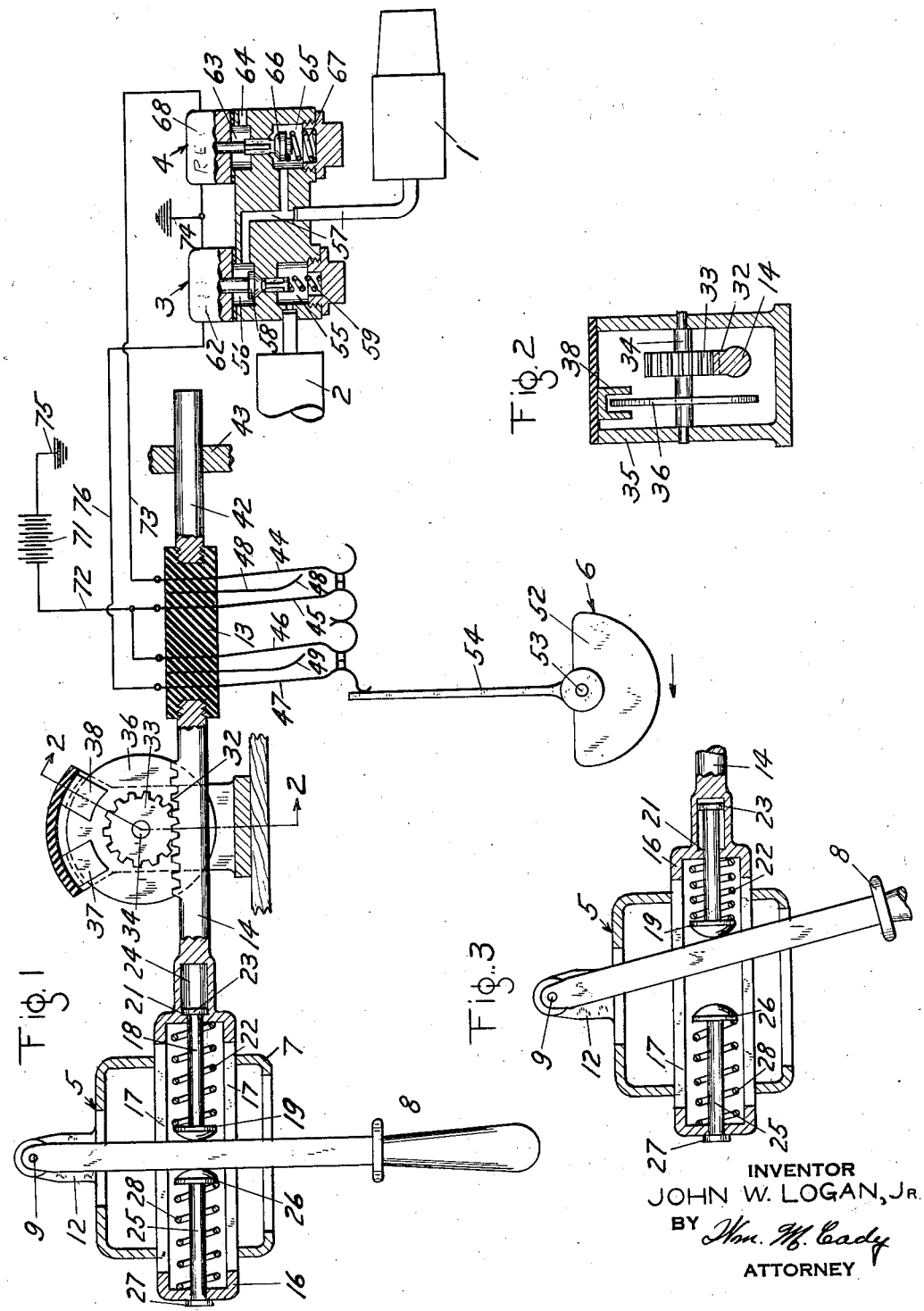
INVENTOR
JOHN W. LOGAN, Jr.
BY Wm. W. Cady
ATTORNEY Patented Nov. 24, 1936

2,061,912

UNITED STATES PATENT OFFICE 2,061,912

RETARDATION CONTROLLER DEVICE

John W. Logan, Jr., Forest Hills, Pa., assignor to The Westinghouse Air Brake Company, Wilmerding, Pa., a corporation of Pennsylvania Application April 8, 1936, Serial No. 73,233

12 Claims. (Cl. 303—24)

This invention relates to brake equipment for vehicles and more particularly to electropneumatic equipment employing a retardation controller having adjusting mechanism which serves as a brake controller device.

It has been proposed to provide a brake equipment having a brake control device adapted, upon movement of a brake controller handle to a chosen position, to so adjust the setting of the retardation controller device as to effect the supply of fluid under pressure to the brake cylinders until the brake cylinder pressure has been increased to produce a rate of retardation of the vehicle corresponding to the adjustment of the retardation controller device as determined by the position of the brake controller handle. The supply of fluid under pressure to the brake cylinders is then automatically cut off by action of the retardation controller device.

In the modern design of fluid pressure brake equipments for high speed trains and vehicles brake cylinder pressure will build up at an extremely rapid rate upon an application of the brakes. It is customary to provide a retardation controller device with such equipment to so control the brake cylinder pressure as to prevent the rate of retardation of the vehicle from exceeding some predetermined or chosen value.

Since the brake cylinder pressure may build up at an extremely rapid rate the pressure in the brake cylinder is likely to attain a value much higher than that required to produce the desired rate of retardation of the vehicle corresponding to the setting of the retardation controller device. This is because the pressure in the brake cylinder does not immediately effect the operation of the retardation controller device since there is always some slack in the brake rigging, and a slight time interval is required for a braking force corresponding to brake cylinder pressure to develop. The retardation controller device therefore does not begin to function until the brake cylinder pressure has "overcast" or increased beyond the value corresponding to the desired rate of retardation of the vehicle.

When the retardation controller device becomes effective to control the brake cylinder pressure this pressure must then be reduced from an excessive value to a value corresponding to the rate of retardation of the vehicle determined by the retardation controller setting. In releasing fluid under pressure from the brake cylinder at a fast rate, too much fluid may be released, the brake cylinder pressure thus becoming too low and requiring a further supply of fluid under pressure to the brake cylinder. This alternate readmission and release of fluid under pressure may continue due to repeated overcasting. This alternate increase and decrease in brake cylinder pressure above and below the desired value is undesirable in that it causes a loss in fluid under pressure from the brake system and also contributes towards producing an irregular and non-uniform stop. Also the rapid rise in brake cylinder pressure with the consequent high rate of retardation of the vehicle, followed by an immediate rapid reduction in brake cylinder pressure at a time when the vehicle body is increasing in retardation, will often produce severe shock in the connecting parts between the truck and vehicle body.

Further, the loss of pressure which results in supplying an excessive amount of fluid under pressure to the brake cylinder and in then reducing the brake cylinder pressure to the required value, consumes some of the reserve of fluid under pressure which should be available in case an emergency application becomes necessary immediately following a service application of the brakes. It is therefore desirable to prevent the brake cylinder pressure from initially rising appreciably beyond the value necessary to produce the chosen or selected rate of retardation.

It is an object of this invention to provide a brake equipment employing a retardation controller device for controlling the rate of retardation of the vehicle in which means is provided to compensate for the time lag between the build up in brake cylinder pressure and the operation of the retardation controller to limit brake cylinder pressure.

It is a further object of this invention to provide equipment of the character described in which the degree of application of the brakes is determined by the adjustment of the retardation controller device, and in which this adjustment takes place gradually after the initial movement of the brake controlling handle during application of the brakes until the desired rate of retardation has been reached.

Other advantages and objects of my invention will be apparent from the following description of one preferred embodiment thereof taken in connection with the accompanying drawing in which Fig. 1 is a diagrammatic view of the apparatus and circuit illustrating one preferred embodiment of the invention, Fig. 2 is a sectional view on the dash line 2—2 of Fig. 1, and Fig. 3 is a plan view of the controller, partly in section, showing the controller handle in service application position, and with the parts as related momentarily at the instant the handle is moved.

Referring to the drawing, the numeral 1 represents a brake cylinder of a fluid pressure brake equipment adapted to be supplied with fluid under pressure from a reservoir 2 in accordance with the operation of an application magnet valve device 3, and from which fluid under pressure is released by operation of the release magnet valve device 4, that are controlled in accordance with the operation of a manually operable controller 5 and a retardation controller device 6. The controller device 5 comprises a stationary casing 7 having a handle 8 pivotally mounted on a pin 9 on a bracket 12 extending outwardly from the casing and adapted to move the contact carrying block 13 laterally toward the right or left to an adjusted position to determine the desired degree of braking in a manner to be later described.

The switch operating mechanism in addition to the contact carrying block 13 comprises a rod 14, one end of which is connected to the block 13 and the other end of which terminates in a tubular casing 16 that extends through openings in the wall of the casing 7 and is movable with respect to the casing 7, and is provided with slots 17 in its opposite sides through which the brake controlling handle 8 extends. Means is provided for biasing the casing 16 and rod 14 with respect to the movement of the brake control handle 8 and comprises a rod 18 provided with an abutment 19 for engaging the handle 8, and that is biased toward the central portion of the casing 16 by a spring 22 one end of which presses against the abutment 19 and the other end of which engages the end of the casing 16 in which it is contained. The rod 18 extends through an opening in the end of the casing 16 and is provided with a head 23 on its outer end that is slidable in a bore 24 within the rod 14 and which serves to limit the movement of the rod 18 toward the left. In the opposite end of the casing 16 is provided a rod 25 having an abutment 26 on the inner end thereof, adapted to engage the handle 8, and a head 27 on the outer end thereof, which end extends through an opening in the wall of the casing 16. A biasing spring 28 is positioned about the rod 25 having one end thereof engaging the abutment 26 and the opposite end engaging the left hand wall of the casing 16 for forcing the abutment 26 toward the right into engagement with a handle 8.

In order to provide a retarded action in the operation of the switch controlling mechanism, after operation of the brake controlling handle 8, a retardation device is provided which as illustrated comprises a rack 32 on one side of the rod 14 having teeth for engaging the teeth of a pinion 33 mounted on a shaft 34 within the walls of a suitable casing 35. A metallic disc or vane 36 of electrically conducting material, such as copper or aluminum, is mounted on and rotates with the shaft 34 and is positioned between permanent magnets 37 and 38. The desired amount of time delay action between the movement of the handle 8 and of the switch controlled mechanism may be provided by selecting the proper relation between the size of the metallic disc 36 and the strength of the permanent magnets 37 and 38, and also by interposing a gear train between the rack and pinion if found necessary.

A guide rod 42 is attached to the side of the switch carrying block 13 opposite to the rod 14 and extends through an opening in a suitable support 43. The contact carrying block 13 supports leaf spring contact members 44 and 45 for controlling the release magnet valve device 4 and leaf spring contact members 46 and 47 for controlling the application magnet valve device 3. The block 13 also carries a stop 48, the lower end of which is spaced slightly from the contact member 44 to limit its motion toward the left and a stop member 49, the lower end of which is spaced a slightly greater distance from the main contact member 46 to limit its motion toward the left slightly after contact member 44 engages the stop 48.

The retardation controller device 6 comprises an inertia element or pendulum 52 that is mounted upon a pivot pin 53, and an upwardly extending arm 54 that is adapted to engage the lower end of the spring contact member 47, and, when the vehicle is at rest or moving at a uniform rate, to cause the several contact members 47, 46, 45 and 44 to be in engagement as illustrated.

The application magnet valve device 3 comprises a casing containing a chamber 55 that is in constant open communication with the reservoir 2, and a chamber 56 that is in constant open communication with the brake cylinder 1 through passage and pipe 57 and which contains an application valve 58 for controlling communication from the reservoir 2 to the brake cylinder 1. A spring 59 is provided within the chamber 55 for normally urging the valve 58 upwardly from its seat, and a magnet 62 is provided in the upper part of the casing which when energized forces the valve 58 downwardly to its seat against the bias of the spring 59.

The release magnet valve device 4 comprises a casing providing a chamber 63 that is in constant open communication with the atmosphere through an exhaust port 64, and a release valve chamber 65 that is in constant communication with the brake cylinder 1 through passage and pipe 57, and which contains a release valve 66 and a spring 67 for biasing the valve 66 towards its seat. A magnet 68 is provided in the upper part of the casing for urging the release valve 66 downwardly from its seat against the bias of the spring 67 when the magnet is energized.

In the position of the brake handle 8 illustrated in Fig. 1, which is the running or brake releasing position, engagement of the retardation controller arm 54 against the contact member 47 causes the several contact members 47, 46, 55 and 54 to be in their illustrated or circuit closing positions. In this position of the switch contact members a circuit is completed from the positive terminal of the battery 71 through conductor 72, the switch contact members 45 and 44, conductor 73, the winding of the magnet 68 in the upper portion of the casing of the release valve device 4, to ground at 74, and to the grounded terminal 75 of the battery 71, thus maintaining the magnet 68 energized and the release valve 66 in its unseated position to effect communication from the brake cylinder 1 to atmosphere through the exhaust port 64. A circuit is also completed from the positive terminal of the battery 71, through conductor 72, switch contact members 46 and 47, conductor 76, the winding of the magnet 62 in the upper portion of the casing of the application magnet valve device 3, to ground at 74, and to the grounded terminal 75

75 of the battery 71, thus maintaining the magnet 62 energized and the application valve 58 seated to close communication between the reservoir 2 and the brake cylinder 1.

When the operator wishes to apply the brakes the handle 8 is moved toward the right or in a counterclockwise direction from the position illustrated in Fig. 1 an amount depending upon the desired deceleration of the vehicle, such, for example, as to the position illustrated in Fig. 3. Upon the movement of the brake handle from the position shown in Fig. 1 to the position shown in Fig. 3 the abutment 19 and rod 18 are forced toward the right, compressing the spring 22, and the pressure of the compressed spring acts to shift the tubular casing structure 16 toward the right until the shoulder 21 at the end of the bore 24 engages the head 23 on the end of the rod 18. The coil springs 28 and 22 on opposite sides of the brake controlling handle 8 tend to position the movable casing 16 so that its center point is positioned in line with the handle 8.

Upon the movement of the casing 16 toward the right, as above described, the rod 14 and contact carrying block 13 are correspondingly moved to the right and, as it is so moved the pressure exerted by the arm 54 of the retardation controller device against the spring contact member 47 is released, thus permitting the contact member 47 to flex toward the left with respect to the block 13, and thus permitting the several switch contact members 47, 46, 45 and 44 to flex toward the left following their natural bias. When so flexed the contact member 44, after a slight movement, engages the stop 48 thus permitting the contact member 45 to move out of engagement with the contact member 44 and interrupt the above traced circuit through the winding of the magnet 68 of the release magnet valve device 4, deenergizing this magnet and permitting the valve 66 to be forced to its seat by the spring 67 to close communication from the brake cylinder 1 to the atmosphere through the exhaust port 64. Upon the slight further movement of the switch contact members toward the left the contact member 46 engages the end of the stop 49 and the contact member 47 moves out of engagement therewith, interrupting the above traced circuit through the winding of the magnet 62 of the application magnet valve device 3, thus deenergizing the magnet 62 and permitting the spring 59 to force the application valve 58 upwardly from its seat to effect communication from the reservoir 2 to the brake cylinder 1 to cause an application of the brakes.

As the brakes are applied and assuming that the direction of movement of the vehicle is toward the left or corresponding to the arrow shown just below the retardation controller device, the pendulum 52 will swing toward the left an amount depending upon the rate of retardation of the vehicle. The arm 54 extending upwardly from the pendulum is therefore moved toward the right a corresponding amount so that the position of the block 13 necessary to effect separation of the contact members 44 and 45, and of the contact members 46 and 47, is a variable depending upon the position of the arm 54 at any instant, that is, upon the rate of deceleration of the vehicle at any particular time.

Upon movement of the handle 8 from the position shown in Fig. 1 to, for example, the position shown in Fig. 3, with the resulting bias of the spring 22 to force the block 13 toward the right, the block 13 starts to move without delay but its rate of motion is sufficiently retarded by the vane 36 that it does not move the contact members 44 and 45 and 46 and 47 completely out of the range of influence of the retardation controller arm 54.

As the contact members 46 and 47 separate, the application magnet valve device 3 operates to supply fluid under pressure to the brake cylinder and, after a slight delay, the rate of retardation of the vehicle starts increasing at a rapid rate and the arm 54 of the retardation controller device moves toward the right decreasing the gap between the contact members 46 and 47. The pendulum 52 and the arm 54 will move the contact member 47 toward the left, causing it to engage the contact member 46 to effect operation of the application magnet valve device 3 to shut off the supply of fluid under pressure to the brake cylinder 1 before the rate of retardation of the vehicle has risen to a value corresponding to the position of the brake handle 8, that is, before the travel of the block 13 has reached the ultimate position effective upon movement of the brake handle 8. The rate of retardation of the vehicle will continue to increase to the desired value as both the pendulum 52 and the block 13 carrying the contact members complete their travel.

It will be seen, therefore, that the position of the contact carrying block 13 determines the permitted rate of retardation of the vehicle, and that the gradual movement of the block 13 toward the right upon any particular desired degree of application of the brakes, causes the braking force during increasing application of the brakes to be so limited at any instance by the retardation controller that excessive application of the brakes is prevented.

Should it be desired, after the brakes have been applied a predetermined amount, upon a predetermined movement of the brake valve handle 8 from its release position, to effect a further application of the brakes, the handle 8 is moved further toward the right, the block 13 being moved under the influence of the springs 28 and 22 of the retarding vane 36 in the same manner as above described to its new position.

This slow response in the change in the setting of the retardation controller is also effected during release of the brakes, or partial release thereof occasioned by moving the handle 8 from a service application position either to the release position to effect a complete release of the brakes or toward the release position to effect a partial release only of the brakes. Further movement of the handle 8 in either direction causes a similar, but time delayed movement of the block 13 as a result of the above described cooperative effect between the springs 28 and 22 and the retarding vane 36.

It will be noted that the characteristic operation of the above described equipment prevails over all degrees of application of the brakes, so that the over-application or over-release of the brakes by movement of the handle 8 is independent of the amount of movement thereof, the equipment being as effective to prevent over-application of the brakes upon a slight movement of the handle 8 as well as upon a full application of the brakes. That is, this invention provides for a slow change in the setting of the retardation controller from zero to any desired value and for continuous control of the brakes by the retardation controller during such change, thus insuring a sufficiently early operation of the retardation controller device in the cycle of change of any brake control operation to prevent the changed conditions from over-traveling the desired amount.

While I have illustrated and described one preferred embodiment of my invention, it will be apparent to those skilled in the art that many changes in the circuits and apparatus described may be made within the spirit of my invention, and I do not wish to be limited otherwise than by the scope of the appended claims.

Having now described my invention, what I claim as new and desire to secure by Letters Patent, is:

1. In a brake equipment for vehicles, in combination, fluid pressure braking means, valve means for controlling the application and release of said braking means, a brake handle for controlling the operation of said valve means, a retardation controller device for also controlling the operation of said valve means for effecting the desired rate of retardation of the vehicle, means responsive to the movement of said handle for adjusting the setting of said retardation controller device, and timing means responsive to the amount of movement of said handle for permitting a gradual change only in the setting of the retardation controller device.

2. In a brake equipment for vehicles, in combination, fluid pressure braking means, valve means for controlling the application and release of said braking means, a retardation controller device responsive to the rate of retardation of the vehicle for controlling said valve means to effect a desired rate of retardation of the vehicle, a brake handle for controlling the operation of said valve means and for adjusting the setting of said retardation controller in accordance with the amount of movement of said brake handle, and timing means responsive to the amount of movement of the handle for determining the time interval required to effect the change in the setting of said retardation controller device.

3. In a brake equipment for vehicles, in combination, fluid pressure braking means, valve means for controlling the application and release of said brake means, a retardation controller device responsive to the rate of retardation of the vehicle for controlling said valve means to effect a desired rate of retardation of the vehicle, a brake handle for controlling the operation of said valve means and for adjusting the setting of said retardation controller device in accordance with the amount of movement of the brake handle, and retarding means effective during a predetermined time thereafter, dependent upon the amount of movement of said handle, for effecting a gradual change in the setting of said retardation controller corresponding to the movement of said handle.

4. In a brake equipment for vehicles, in combination, a brake cylinder, electrically operated valves for controlling the application and release of fluid under pressure to and from said brake cylinder, a brake handle for controlling the operation of said valve, means actuated upon the movement of said handle to a service position for effecting an application operation of said valve, a retardation controller device for also controlling the operation of said valve to effect a desired rate of retardation of the vehicle, means biased upon the movement of said handle in either direction for adjusting the setting of said retardation controller device, and retardation means associated therewith for introducing a graduated movement into the operation of said adjusting means that is substantially proportional to the amount of movement of said handle.

5. In a brake equipment for vehicles, electrically operable means for controlling the application and release of the brakes, a brake handle for controlling the energization of said electrically operable means, cooperating contact members effective for initiating operation of said electrically operable means for any service position of the handle, a retardation controller device responsive to the rate of deceleration of the vehicle for also controlling said electrically operable means for effecting a rate of retardation of the vehicle for effecting a desired rate of retardation of the vehicle, means for adjusting the setting of the retardation controller device comprising an element biased to a predetermined position relative to the handle, and a retarding device for establishing a time interval required to effect movement thereof to said predetermined position following movement of the handle, and means comprising cooperating contact members effective when said controlling element is in said predetermined position for holding the electrically operable means in adjusted position.

6. In a brake equipment for vehicles, electrically operable means for controlling the application and release of the brakes, a brake handle for controlling the energization of said electrically operable means, cooperating contact members effective for initiating operation of said electrically operable means in any service position of the handle and subject to movement by said brake handle, a retardation controller device responsive to the rate of retardation of the vehicle and effective to position said contact members to effect a release of the brakes when said handle is positioned in release position, said cooperating contact members being movable from a position of influence by said retardation controller device upon movement of said handle to a brake applying position, and means biased to a predetermined position relative to the handle having a retarding device for retarding movement thereof to said predetermined position following movement of the handle, said retardation controller being effective to extend its range of influence on said contact members with increasing rate of deceleration of the vehicle.

7. In a brake equipment for vehicles, in combination, a brake cylinder, electrically operable means for controlling the flow of fluid under pressure to and from said brake cylinder, an inertia device, means for controlling said electrically operable means comprising a movable member having a release position and a brake applying zone and carrying cooperating contact members thereon, means actuated by said inertia responsive device when said movable member is in a brake releasing position for biasing said cooperating contact members to a position to effect venting of the brake cylinder, said cooperating contact members being normally biased to effect an application of the brakes when said movable member is moved from its release position to any position in the brake applying zone, and a brake controlling handle, means for biasing said movable member to a predetermined position relative to the handle for determining the rate of retardation of the vehicle necessary to effect control of said cooperating contact members by said inertia device, and a retarding device for permitting a gradual movement only thereof.

8. In a brake equipment for vehicles, in combination, a brake cylinder, electrically operable means for controlling the flow of fluid under pressure to and from said brake cylinder, an inertia responsive device, means for controlling said electrically operable means comprising a movable member having a release position and a brake applying zone and carrying operating contact members thereon, means actuated by said pressure responsive device when said movable member is in a brake release position for biasing said contact members to a position to effect venting of the brake cylinder, said cooperating contact members being normally biased to effect an application of the brakes when said movable member is moved from its release position to any position in a brake applying zone, a brake controlling handle, biasing means on opposite sides of said handle for centering said movable member with respect to said handle, and a retardation device for limiting the rate of such movement in either direction to permit a gradual movement only the duration of which is substantially proportional to the amount of said movement.

9. In a brake equipment for vehicles, in combination, a brake cylinder, electrically operable means for controlling the flow of fluid under pressure to and from said brake cylinder, an inertia responsive device, means for controlling said electrically operable means comprising a movable member having a release position and a brake applying zone and carrying cooperating contact members thereon, means actuated by said inertia responsive device when said movable member is in a brake releasing position for biasing said contact members to a position to effect the venting of fluid under pressure from the brake cylinder, said cooperating contact members being normally biased to effect an application of the brakes when said movable member is moved from its release position to any position in the brake applying zone, a brake controlling handle, biasing means for urging said movable member in either direction toward a definite position relative to the handle upon the movement of the handle, and a retardation device for limiting the rate of such movement to provide a gradual adjustment that is substantially proportional in duration to the amount of the movement of the handle.

10. In a brake equipment for vehicles, in combination, fluid pressure braking means, valve means for controlling the application and release of said braking means, a brake handle for controlling the operation of said valve means, a retardation controller device for also controlling said valve means for effecting a desired rate of retardation of the vehicle, means for adjusting the setting of the retardation controller device comprising biasing means for urging said movable element in either direction toward a definite position relative to the handle upon movement of the handle, a retardation device for limiting the rate of such movement to provide a duration of movement that is substantially proportional to the amount of the movement of the handle.

11. In a brake equipment for vehicles, in combination, a brake cylinder, valve means for controlling the supply of fluid under pressure to and from said brake cylinder, a retardation controller device responsive to the rate of retardation of the vehicle for controlling the valve means to effect a desired rate of retardation of the vehicle, a brake controlling handle for controlling the operation of said valve means, means for adjusting the setting of said retardation controller device comprising a movable member extending on either side of the handle and provided with opposing springs for biasing said member in either direction toward a predetermined position relative to the handle, and a retarding device for delaying the movement of said member to effect a gradual movement thereof to said predetermined position following movement of the handle.

12. In a brake equipment for vehicles, electrically operable means for controlling the application and release of the brakes, a brake handle for controlling the energization of said electrically operable means, cooperating contact members effective for initiating operation of said electrically operable means in any service position of the handle, a retardation controlling device for also actuating said cooperating contact members for limiting the rate of retardation of the vehicle to a desired value, and means for establishing the desired rate of retardation of the vehicle comprising a movable member extending on either side of the handle and provided with opposing springs for biasing said member in either direction toward a predetermined position relative to the handle, and a retarding device for retarding the movement of said member to effect a gradual movement thereof to said predetermined position following movement of the handle.

JOHN W. LOGAN, Jr.